United States Patent
Kim et al.

(10) Patent No.: US 11,652,210 B2
(45) Date of Patent: May 16, 2023

(54) BINDER SOLUTION FOR ALL-SOLID-STATE BATTERIES, ELECTRODE SLURRY INCLUDING THE BINDER SOLUTION, AND METHOD OF MANUFACTURING ALL-SOLID-STATE BATTERY USING THE ELECTRODE SLURRY

(71) Applicants: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(72) Inventors: Sang Mo Kim, Seoul (KR); Yong Sub Yoon, Seoul (KR); Jae Min Lim, Suwon-si (KR); Jin Soo Kim, Suwon-si (KR); Sang Heon Lee, Yongsin-si (KR); Yoon Seok Jung, Seoul (KR); Young Jin Nam, Suwon-si (KR); Sung Hoo Jung, Changwon-si (KR); Dae Yang Oh, Bucheon-si (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 17/729,500

(22) Filed: Apr. 26, 2022

(65) Prior Publication Data
US 2022/0255082 A1     Aug. 11, 2022

Related U.S. Application Data

(62) Division of application No. 16/291,847, filed on Mar. 4, 2019, now Pat. No. 11,342,562.

(30) Foreign Application Priority Data

Aug. 16, 2018     (KR) .................. 10-2018-0095653

(51) Int. Cl.
  *H01M 4/04*     (2006.01)
  *H01M 4/62*     (2006.01)
  (Continued)

(52) U.S. Cl.
  CPC ......... *H01M 4/622* (2013.01); *H01M 4/0404* (2013.01); *H01M 4/139* (2013.01);
  (Continued)

(58) Field of Classification Search
  None
  See application file for complete search history.

(56) References Cited

U.S. PATENT DOCUMENTS

| 5,599,355 A | 2/1997 | Nagasubramanian et al. |
| 8,906,549 B1 | 12/2014 | Palazzo |

(Continued)

FOREIGN PATENT DOCUMENTS

| CN | 105900268 A | 8/2016 |
| CN | 107039655 A | 8/2017 |

(Continued)

OTHER PUBLICATIONS

U.S. Notice of Allowance dated Jan. 27, 2022 issued in U.S. Appl. No. 16/291,847.

(Continued)

*Primary Examiner* — Imran Akram
(74) *Attorney, Agent, or Firm* — Morgan, Lewis & Bockius LLP

(57) ABSTRACT

The present disclosure relates to a binder solution for all-solid-state batteries. The binder solution includes a polymer binder, a first solvent, and an ion-conductive additive, (Continued)

wherein the ion-conductive additive includes lithium salt and a second solvent, which is different from the first solvent.

4 Claims, 4 Drawing Sheets

(51) Int. Cl.
  *H01M 4/139* (2010.01)
  *H01M 10/0569* (2010.01)
  *H01M 10/0562* (2010.01)
  *H01M 10/058* (2010.01)
  *H01M 10/0525* (2010.01)

(52) U.S. Cl.
  CPC ..... *H01M 10/058* (2013.01); *H01M 10/0525* (2013.01); *H01M 10/0562* (2013.01); *H01M 10/0569* (2013.01); *H01M 2300/0022* (2013.01); *H01M 2300/0074* (2013.01); *H01M 2300/0082* (2013.01)

(56) References Cited

U.S. PATENT DOCUMENTS

| | | | | |
|---|---|---|---|---|
| 2007/0243465 | A1* | 10/2007 | Song | H01M 4/581 |
| | | | | 429/231.95 |
| 2009/0136846 | A1 | 5/2009 | Lee et al. | |
| 2009/0202707 | A1* | 8/2009 | Usui | H01M 4/0404 |
| | | | | 118/107 |
| 2010/0297498 | A1* | 11/2010 | Bernard | H01M 4/742 |
| | | | | 427/58 |
| 2014/0120410 | A1* | 5/2014 | Jeoung | H01M 4/131 |
| | | | | 429/211 |
| 2015/0030932 | A1* | 1/2015 | Yoshida | H01M 4/1395 |
| | | | | 429/231.9 |
| 2015/0311508 | A1 | 10/2015 | Cairns | |
| 2015/0318575 | A1* | 11/2015 | Choi | H01M 10/052 |
| | | | | 429/333 |
| 2016/0149218 | A1* | 5/2016 | Liu | H01M 4/621 |
| | | | | 429/337 |
| 2016/0248087 | A1 | 8/2016 | Kim | |
| 2017/0214051 | A1* | 7/2017 | Yoon | H01M 10/0525 |
| 2017/0263978 | A1* | 9/2017 | Koh | H01M 4/136 |
| 2017/0324076 | A1* | 11/2017 | Lee | H01M 10/052 |
| 2018/0226677 | A1 | 8/2018 | Nishiura | |

FOREIGN PATENT DOCUMENTS

| | | |
|---|---|---|
| CN | 107346819 A | 11/2017 |
| JP | H09-180725 A | 7/1997 |
| JP | 2000-021406 A | 1/2000 |
| JP | 2010-146823 A | 7/2010 |
| JP | 2013-033659 A | 2/2013 |
| JP | 2013-089437 A | 5/2013 |
| JP | 2013-216725 A | 10/2013 |
| JP | 2017-168435 A | 9/2017 |
| KR | 10-2013-0056204 A | 5/2013 |
| KR | 19-2014-0005079 A | 1/2014 |

OTHER PUBLICATIONS

U.S. Final Office Action dated Oct. 15, 2021 issued in U.S. Appl. No. 16/291,847.
U.S. Non-Final Office Action dated May 5, 2021 issued in U.S. Appl. No. 16/291,847.
U.S. Final Office Action dated Jan. 25, 2021 issued in U.S. Appl. No. 16/291,847.
U.S. Non-Final Office Action dated Jan. 9, 2020 issued in U.S. Appl. No. 16/291,847.

* cited by examiner

BINDER SOLUTION FOR ALL-SOLID-STATE BATTERIES, ELECTRODE SLURRY INCLUDING THE BINDER SOLUTION, AND METHOD OF MANUFACTURING ALL-SOLID-STATE BATTERY USING THE ELECTRODE SLURRY

CROSS-REFERENCE TO RELATED APPLICATION

This application is a Divisional Patent Application of U.S. patent application Ser. No. 16/291,847, filed on Mar. 4, 2019, which claims the benefit of and priority to Korean Patent Application No. 10-2018-0095653, filed on Aug. 16, 2018, the entire contents of which are incorporated herein by reference.

FIELD

The present disclosure relates to a binder solution for all-solid-state batteries, an electrode slurry including the binder solution, and a method of manufacturing an all-solid-state battery using the electrode slurry.

BACKGROUND

The statements in this section merely provide background information related to the present disclosure and may not constitute prior art.

Secondary batteries, which can be charged and discharged, are used for large-sized transportation means, such as hybrid vehicles and electric vehicles, as well as small-sized electronic devices, such as mobile phones and laptop computers.

Most conventional secondary batteries are manufactured based on an organic solvent (e.g. an organic liquid electrolyte), whereby there are limitations in the stability and energy density thereof.

Meanwhile, an all-solid-state battery, which uses an inorganic solid electrolyte, is based on technology that obviates an organic solvent. Consequently, it is possible to manufacture an all-solid-state battery that is safer and simpler.

However, the energy density and output of the all-solid-state battery can be lower than those of a conventional lithium ion battery using a liquid electrolyte.

In particular, the electrode of the all-solid-state battery includes an electrode active material and a solid electrolyte, both of which are solid materials. For this reason, the electrode may include a binder. When the binder is added to the electrode, which includes the electrode active material and the solid electrolyte, however, the uniformity of the electrode may be reduced, and the formation of an ion transmission path in the electrode is impeded.

It may be desirable to increase the size, the charge and discharge capacity, and the lifespan of the all-solid-state battery.

The above information disclosed in this Background section is provided only for enhancement of understanding of the background of the disclosure and therefore it may contain information that does not form the prior art that is already known to a person of ordinary skill in the art.

SUMMARY

The present disclosure provides a binder solution that is capable of providing the force of binding between respective components of an electrode and forming a smooth ion transmission path in the electrode.

The present disclosure also provides a binder solution that enables the manufacture of an electrode having a large area.

The present disclosure provides a binder solution that enables the manufacture of an all-solid-state battery at a high temperature.

The present disclosure provides a binder solution that enables the manufacture of an all-solid-state battery capable of operating even in a high-temperature environment.

The present disclosure is not limited to the description above. The present disclosure will be clearly understood from the following description and could be implemented by means defined in the claims or mixtures thereof.

In one aspect, the present disclosure provides a binder solution for all-solid-state batteries, the binder solution including a polymer binder, a first solvent, and an ion-conductive additive.

The ion-conductive additive may include lithium salt and a second solvent, which is different from the first solvent.

The polymer binder may be selected from the group consisting of nitrile-butadiene rubber (NBR), butadiene rubber (BR), polystyrene (PS), styrene butadiene rubber (SBR), polymethyl methacrylate (PMMA), polyethylene oxide (PEO), or mixtures thereof.

The first solvent may have a dielectric constant ($\varepsilon$) of 1 to 10 and a Gutmann donor number (DN) of 0 to 10.

The first solvent may be selected from the group consisting of toluene, hexane, dibromomethane, dichloromethane, chloroform, butyl butyrate, hexyl butyrate, or mixtures thereof.

The second solvent may have a dielectric constant ($\varepsilon$) of 5 to 10 and a Gutmann donor number (DN) of 10 to 20.

The absolute value ($|\Delta\varepsilon|$) of the difference in dielectric constant between the first solvent and the second solvent may range from 0 to 5.

The second solvent may be selected from the group consisting of triethylene glycol dimethyl ether, tetraethylene glycol dimethyl ether, 12-Crown-4, 15-Crown-5, 18-Crown-6, or mixtures thereof.

The lithium salt may be selected from the group consisting of lithium hexafluorophosphate ($LiPF_6$), lithium bis(fluorosulfonyl)imide (LiFSI), lithium bis(trifluoromethanesulfonyl)imide (LiTFSI), lithium bis(pentafluoroethanesulfonyl)imide (LiBETI), or mixtures thereof.

The second solvent may include an oxygen element, and a lithium element of the lithium salt may exist in the state of being bonded with the oxygen element in the second solvent.

The molar ratio of the lithium salt to the second solvent may be 1 to 1.2.

The binder solution may include greater than 0 wt % to 10 wt % of the polymer binder, greater than 0 wt % to 10 wt % of the ion-conductive additive, and a remaining quantity of the first solvent.

In another aspect, the present disclosure provides an electrode slurry including the binder solution, an electrode active material, a conductive material, and a solid electrolyte.

The electrode slurry may include greater than 0 wt % to 30 wt % of the binder solution, greater than 0 wt % to 10 wt % of the conductive material, greater than 0 wt % to 20 wt % of the solid electrolyte, and a remaining quantity of the electrode active material.

In another aspect, the present disclosure provides a method of manufacturing an all-solid-state battery, the method including preparing an ion-conductive additive including lithium salt and a second solvent, mixing a polymer binder, a first solvent, and the ion-conductive additive to manufacture a binder solution, mixing the binder solution, an electrode active material, a conductive material, and a solid electrolyte to manufacture an electrode slurry, and applying the electrode slurry to a substrate and drying the electrode slurry at a temperature of 60° C. to 120° C. to form an electrode.

In a further aspect, the present disclosure provides a method of using an all-solid-state battery, wherein the all-solid-state battery is operated at a temperature of 70° C. or higher.

Other aspects of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The above and other features of the present disclosure will now be described in detail with reference to the accompanying drawings which are given hereinbelow by way of illustration only, and thus are not limitative of the present disclosure, and wherein.

Figure 1:
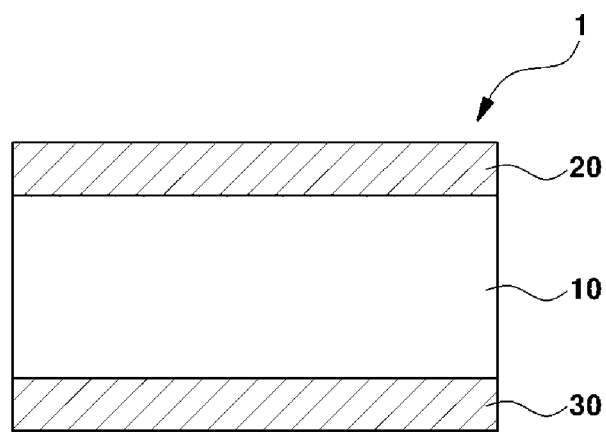
FIG. 1 is a schematic sectional view showing an all-solid-state battery according to an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The features of the present disclosure will be clearly understood with reference to the annexed drawings. The illustrated forms are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

FIG. 1 is a schematic sectional view showing an all-solid-state battery according to an aspect of the present disclosure.

The all-solid-state battery, denoted by 1, includes a solid electrolyte layer 10 and a positive electrode 20 and a negative electrode 30 formed on opposite surfaces of the solid electrolyte layer 10. In this specification, the term "electrode" refers to the positive electrode 20 or the negative electrode 30. In addition, the electrode may be interpreted as a concept including a positive electrode current collector (not shown) or a negative electrode current collector (not shown) in addition to the positive electrode 20 or the negative electrode 30. The respective components of the all-solid-state battery 1 will be described below.

At least one of the solid electrolyte layer 10, the positive electrode 20, and the negative electrode 30 includes a binder.

The binder originates in a binder solution. Hereinafter, a binder solution according to the present disclosure will be described in detail.

Binder Solution

The binder solution includes a polymer binder, a first solvent, and an ion-conductive additive. The ion-conductive additive includes lithium salt and a second solvent, which is different from the first solvent.

The polymer binder binds the respective components of the electrode.

The polymer binder may be selected from the group consisting of nitrile-butadiene rubber (NBR), butadiene rubber (BR), polystyrene (PS), styrene butadiene rubber (SBR), polymethyl methacrylate (PMMA), polyethylene oxide (PEO), or mixtures thereof.

The polymer binder may serve to impede the formation of an ion transmission path in the electrode. The present disclosure is characterized in that the ion-conductive additive is added to the binder solution.

The first solvent dissolves the polymer binder. When an electrode slurry is manufactured using the binder solution and an electrode is then formed, the polymer binder may be uniformly distributed in the electrode, since the polymer binder is dissolved in the first solvent. As a result, an electrode having a large area may be formed.

The first solvent may have a dielectric constant ($\varepsilon$) of 1 to 10 and a Gutmann donor number (DN) of 0 to 10. A dielectric constant is a relative value of the permittivity of a substance to the permittivity of a vacuum. The Gutmann donor number is one of multiple solvent parameters, and is an index of electron (pair) donation. When a compound has a large Gutmann donor number, the compound exhibits high electron (pair) donation and coordination ability.

The first solvent may be selected from the group consisting of toluene, hexane, dibromomethane, dichloromethane, chloroform, butyl butyrate, hexyl butyrate, or mixtures thereof.

Since the first solvent has a low boiling point, the first solvent may evaporate when the electrode is dried during the manufacture of the electrode.

The ion-conductive additive includes lithium salt and a second solvent. In general, the ion conduction path in the electrode of the all-solid-state battery is formed by a solid electrolyte. As previously described, however, the ion conduction path may not be smoothly formed by the polymer binder, which binds the respective components of the electrode. In the present disclosure, the ion-conductive additive is added to the binder solution such that the ion-conductive additive forms an additional ion conduction path in the electrode. The details thereof will be described below.

The second solvent dissolves the lithium salt. The second solvent may have a dielectric constant ($\varepsilon$) of 5 to 10 and a Gutmann donor number (DN) of 10 to 20.

When the dielectric constant and the Gutmann donor number of the second solvent are higher, lithium salt is more easily dissolved. If the difference between the dielectric constant of the second solvent and the dielectric constant of the first solvent is too large, however, the second solvent is not sufficiently dissolved in the first solvent, whereby the ion conduction path in the electrode may not be smoothly formed. Specifically, the absolute value ($|\Delta\varepsilon|$) of the difference in dielectric constant between the first solvent and the second solvent may range from 0 to 5.

The second solvent may be a linear or cyclic organic solvent including an ether group (—O—). Specifically, the second solvent may be selected from the group consisting of triethylene glycol dimethyl ether, tetraethylene glycol dimethyl ether, 12-Crown-4, 15-Crown-5, 18-Crown-6, or mixtures thereof.

12-Crown-4 is a compound represented by Chemical Formula 1.

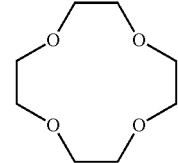

[Chemical Formula 1]

15-Crown-5 is a compound represented by Chemical Formula 2.

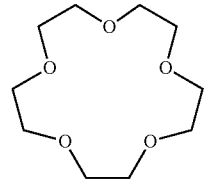

[Chemical Formula 2]

18-Crown-6 is a compound represented by Chemical Formula 3.

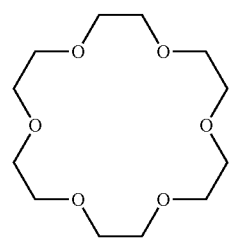

[Chemical Formula 3]

Since the second solvent includes an ether group, the second solvent may react with a solid electrolyte, particularly a sulfide-based solid electrolyte, in the electrode. The reason for this is that, since P—O binding is preferred to P—S binding according to the principle of hard and soft acids and bases, an oxygen element of the second solvent breaks the binding between a sulfur element and phosphorus element of the sulfide-based solid electrolyte.

In the present disclosure, however, a solvent having high dissolution of lithium salt is used as the second solvent. When lithium salt is dissolved in the second solvent, lithium positive ions (Li$^+$) are generated. Since the lithium positive ions (Li$^+$) and the oxygen element of the second solvent are coordinate-bonded, the oxygen element of the second solvent does not react with the sulfide-based solid electrolyte. That is, since the oxygen element included in the second solvent exists in the state of being bonded with the lithium element of the lithium salt, the oxygen element included in the second solvent does not react with the sulfide-based solid electrolyte.

The lithium salt may be selected from the group consisting of lithium hexafluorophosphate (LiPF$_6$), lithium bis (fluorosulfonyl)imide (LiFSI), lithium bis(trifluoromethanesulfonyl)imide (LiTFSI), lithium bis(pentafluoroethanesulfonyl)imide (LiBETI), or mixtures thereof.

The lithium salt may be divided into lithium positive ions ($Li^+$) and negative ions ($A^-$). Lithium salt including large-sized negative ions may be used. When the size of the negative ions is increased, Coulomb force between the negative ions and the lithium positive ions, which are coordinate-bonded with the oxygen element of the second solvent, decreases, whereby a large amount of lithium positive ions may easily be bonded with the second solvent. Consequently, the reaction between the second solvent and the sulfide-based solid electrolyte is more effectively restrained, whereby the stability of the battery is improved.

The ion-conductive additive may include the lithium salt and the second solvent in the state in which the lithium salt and the second solvent are present in similar molar amounts. Specifically, the molar ratio of the lithium salt to the second solvent may be 1 to 1.2.

The present disclosure is technically characterized in that the ion-conductive additive is added to the binder solution.

First, the ion-conductive additive, in which the lithium salt is dissolved in the second solvent, exists as composite positive ions (Li(second solvent)$^+$), formed due to high chemical affinity between the second solvent and the lithium positive ions ($Li^+$), and negative ions ($A^-$), whereby the electrostatic attractive force of the solution is increased. Consequently, the boiling point of the ion-conductive additive becomes higher than that of the second solvent.

Since the boiling point of the ion-conductive additive, in which the lithium salt is dissolved in the second solvent, is high, the ion-conductive additive does not evaporate when the electrode is dried during the manufacture of the electrode (60° C. to 120° C.). Consequently, the lithium salt dissolved in the second solvent may exist in the electrode in the state of lithium positive ions ($Li^+$) and negative ions ($A^-$). Since the lithium positive ions ($Li^+$) form an additional ion conduction path for lithium ions in the electrode, the charge and discharge capacity of the battery is greatly increased.

In addition, since the lithium positive ions ($Li^+$) are coordinate-bonded with the oxygen element of the second solvent, damage to the sulfide-based solid electrolyte due to the second solvent is inhibited.

In addition, since a solvent having a dielectric constant that is not greatly different from that of the first solvent is used as the second solvent, the ion-conductive additive may be uniformly distributed in the binder solution. Even when a large-sized electrode is manufactured, therefore, the second solvent and the lithium salt dissolved therein may be uniformly distributed in the electrode. Consequently, the same effect as above may be obtained even when an electrode having a large area is manufactured.

Also, in the case in which a crown-ether-based solvent, such as 12-Crown-4, 15-Crown-5, or 18-Crown-6, is used as the second solvent, the same effect as above may be obtained even when the electrode or the battery is manufactured at a high temperature, since the boiling point of the second solvent is high. Consequently, it is possible to manufacture a good-quality all-solid-state battery within a short processing time.

In addition, since the boiling point of the second solvent is high, the ion-conductive additive is not volatilized even when the all-solid-state battery is used in a high-temperature environment. Consequently, the ion transmission path formed in the electrode, which originates in the ion-conductive additive, may be maintained. In this case, the all-solid-state battery may be used in various fields.

An additive including lithium bis(pentafluoroethanesulfonyl)imide (LiBETI), which is lithium salt having large-sized negative ions, and a second solvent having a high boiling point, such as 12-Crown-4, 15-Crown-5, and/or 18-Crown-6, may be used as the ion-conductive additive. However, the present disclosure is not limited thereto.

The binder solution may include greater than 0 wt % to 10 wt % of a polymer binder, greater than 0 wt % to 10 wt % of an ion-conductive additive, and a remaining quantity of a first solvent.

Electrode of All-Solid-State Battery

The electrode of the all-solid-state battery according to the present disclosure may be manufactured through wet processing. Specifically, an electrode slurry including the binder solution, an electrode active material, a conductive material, and a solid electrolyte may be prepared, applied to a substrate, and dried to manufacture an electrode.

The electrode slurry may include greater than 0 wt % to 30 wt % of a binder solution, greater than 0 wt % to 10 wt % of a conductive material, greater than 0 wt % to 20 wt % of a solid electrolyte, and a remaining quantity of an electrode active material.

The binder solution has been described previously, and a detailed description thereof will be omitted.

The electrode active material may be a positive electrode active material or a negative electrode active material.

For example, the positive electrode active material may be an oxide active material or a sulfide active material. However, the positive electrode active material is not particularly restricted.

The oxide active material may be a halite-layer-type active material, such as $LiCoO_2$, $LiMnO_2$, $LiNiO_2$, $LiVO_2$, or $Li_{1+x}Ni_{1/3}Co_{1/3}Mn_{1/3}O_2$, a spinel-type active material, such as $LiMn_2O_4$ or $Li(Ni_{0.5}Mn_{1.5})O_4$, an inverse-spinel-type active material, such as $LiNiVO_4$ or $LiCoVO_4$, an olivine-type active material, such as $LiFePO_4$, $LiMnPO_4$, $LiCoPO_4$, or $LiNiPO_4$, a silicon-containing active material, such as $Li_2FeSiO_4$ or $Li_2MnSiO_4$, a halite-layer-type active material having some of a transition metal replaced by a different kind of metal, such as $LiNi_{0.8}Co_{(0.2-x)}Al_xO_2$ (0<x<0.2), a spinel-type active material having some of a transition metal replaced by a different kind of metal, such as $Li_{1+x}Mn_{2-x-y}M_yO_4$ (M being at least one of Al, Mg, Co, Fe, Ni, and Zn, and 0<x+y<2), or lithium titanate, such as $Li_4Ti_5O_{12}$.

The sulfide active material may be copper chevrel, iron sulfide, cobalt sulfide, or nickel sulfide.

For example, the negative electrode active material may be a carbon active material or a metal active material. However, the negative electrode active material is not particularly restricted.

The carbon active material may be graphite, such as mesocarbon microbeads (MCMB) or highly oriented pyrolytic graphite (HOPG), or amorphous carbon, such as hard carbon or soft carbon.

The metal active material may be In, Al, Si, Sn, or an alloy including at least one of the above elements.

The conductive material forms an electron conduction path in the electrode. The conductive material may be an $sp^2$ carbon material, such as carbon black, conductive graphite, ethylene black, or carbon nanotubes, or graphene.

The solid electrolyte may be an oxide-based solid electrolyte or a sulfide-based solid electrolyte. A sulfide-based solid electrolyte, which has high lithium ion conductivity, may be used.

The sulfide-based solid electrolyte may be $Li_2S—P_2S_5$, $Li_2S—P_2S_5—LiI$, $Li_2S—P_2S_5—LiCl$, $Li_2S—P_2S_5—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m and n are positive numbers, and Z is one of Ge, Zn, and Ga), $Li_2S—GeS_2$, $Li_2S—SiS_2—Li_3PO_4$, $Li_2S—SiS_2—Li_xMO_y$ (where x and y are positive numbers, and M is one of P, Si, Ge, B, Al, Ga, and In), or $Li_{10}GeP_2S_{12}$.

Solid Electrolyte Layer of All-Solid-State Battery

The solid electrolyte layer 10 is disposed between the positive electrode 20 and the negative electrode 30 to allow lithium ions to move between the two electrodes.

The solid electrolyte layer 10 may include a solid electrolyte identical to or different from the solid electrolyte included in the electrode described above. The solid electrolyte layer 10 may include a sulfide-based solid electrolyte having high lithium ion conductivity.

Method of Manufacturing All-Solid-State Battery

A method of manufacturing an all-solid-state battery according to the present disclosure may include a step of preparing an ion-conductive additive including lithium salt and a second solvent, a step of mixing a polymer binder, a first solvent, and the ion-conductive additive to manufacture a binder solution, a step of mixing the binder solution, an electrode active material, a conductive material, and a solid electrolyte to manufacture an electrode slurry, and a step of applying the electrode slurry to a substrate and drying the electrode slurry at a temperature of 60° C. to 120° C. to form an electrode.

In the method of manufacturing the all-solid-state battery, the electrode may be pressed against a solid electrolyte layer. Alternatively, the electrode slurry may be applied to the solid electrolyte layer and dried to form the electrode.

Since the boiling point of the second solvent is high, as previously described, the electrode slurry may be applied to the substrate and then dried at a temperature of 60° C. to 120° C. to form the electrode.

In addition, since the ion transmission path formed in the electrode, which originates in the ion-conductive additive, is maintained even in a high-temperature environment, as previously described, the all-solid-state battery may have a high capacity even at a temperature of about 70° C. or higher.

Hereinafter, the present disclosure will be described in more detail with reference to examples. However, the following examples are merely illustrations to assist in understanding the present disclosure, and the present disclosure is not limited by the following examples.

Example 1

Lithium bis(trifluoromethanesulfonyl)imide (LiTFSI) was prepared as lithium salt, and triethylene glycol dimethyl ether was prepared as a second solvent such that the molar ratio of the lithium salt to the second solvent was 1. The second solvent was dried using a molecular sieve and $CaH_2$. Lithium salt was added to the second solvent, and the mixture was stirred to prepare an ion-conductive additive.

10 wt % of the ion-conductive additive, 4.5 wt % of a polymer binder, and 85.5 wt % of a first solvent were stirred to manufacture a binder solution. Nitrile-butadiene rubber (NBR) was used as the polymer binder, and dibromomethane was used as the first solvent.

26.1 wt % of the binder solution, 54.4 wt % of an electrode active material, 0.8 wt % of a conductive material, and 18.7 wt % of a solid electrolyte were mixed to manufacture an electrode slurry. A halite-layer-type active material, such as $Li_{1+x}Ni_{1/3}Co_{1/3}Mn_{1/3}O_2$, was used as the electrode active material, carbon black was used as the conductive material, and $Li_2S—P_2S_5—LiCl$ was used as the solid electrolyte. The first solvent may be further added to adjust the viscosity of the slurry so as to be suitable for processing.

The electrode slurry was applied to a solid electrolyte layer and was then dried at a temperature of 60° C. for two hours to form a positive electrode.

Lithium-indium foil (Li—In foil) as a negative electrode was attached to a stack of the positive electrode and the solid electrolyte layer to complete the all-solid-state battery.

For reference, in the example, the positive electrode was manufactured using the ion-conductive additive in order to prove the above-described effects. For this reason, a lithium metal was used as the negative electrode. However, it will be obvious to those skilled in the art that the same effects can be obtained even in the case in which the negative electrode is manufactured in a manner identical or similar to the positive electrode to complete the all-solid-state battery.

Examples 2 to 8

All-solid-state batteries were manufactured in the same manner as in Example 1, except that the all-solid-state batteries were completed using the materials shown in Table 1 under the conditions shown in Table 1.

TABLE 1

| Classification | Lithium salt | Second solvent | Lithium salt/ Second solvent | Drying condition of electrode slurry [° C.] |
|---|---|---|---|---|
| Example 1 | LiTFSI | triethylene glycol dimethyl ether | 1 | 60 |
| Example 2 | LiTFSI | tetraethylene glycol dimethyl ether | 1 | 90 |
| Example 3 | LiTFSI | tetraethylene glycol dimethyl ether | 1 | 90 |
| Example 4 | LiBETI | tetraethylene glycol dimethyl ether | 1 | 60 |
| Example 5 | LiBETI | tetraethylene glycol dimethyl ether | 1 | 120 |
| Example 6 | LiBETI | tetraethylene glycol dimethyl ether | 1.1 | 120 |
| Example 7 | LiBETI | tetraethylene glycol dimethyl ether | 1.2 | 120 |
| Example 8 | LiBETI | 18-Crown-6 | 1 | 120 |

Comparative Example

An all-solid-state battery was manufactured without adding an ion-conductive additive. At this time, an additional amount of a first solvent equivalent to the amount of the ion-conductive additive, which was not added, was added to manufacture a binder solution. The all-solid-state battery was manufactured in the same manner as in Example 1, with the above exception.

Figure 2:
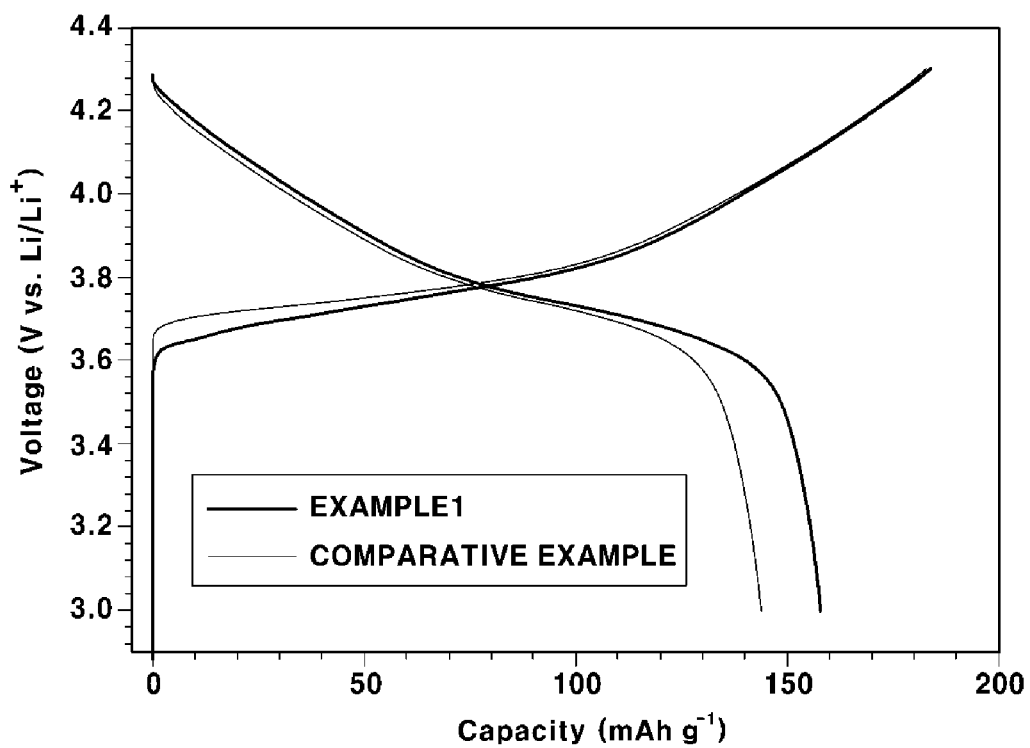
FIG. 2 is a graph showing the evaluation results of charging and discharging of all-solid-state batteries according to Example 1 and Comparative Example.

Experimental Example 1—Evaluation of Performance of All-Solid-State Battery Including Ion-Conductive Additive Charging and discharging of the all-solid-state batteries according to Example 1 and Comparative Example were evaluated. The results are shown in FIG. 2. FIG. 2 is a graph showing the result values of voltage-capacity behaviors when the all-solid-state batteries according to Example 1 and Comparative Example were charged and discharged under conditions of 0.26 mA·cm$^{-2}$ and 30° C.

Referring to FIG. 2, it can be seen that the charge and discharge capacity of the all-solid-state battery including the ion-conductive additive according to Example 1 is higher than that of the all-solid-state battery according to Comparative Example.

Figure 3:
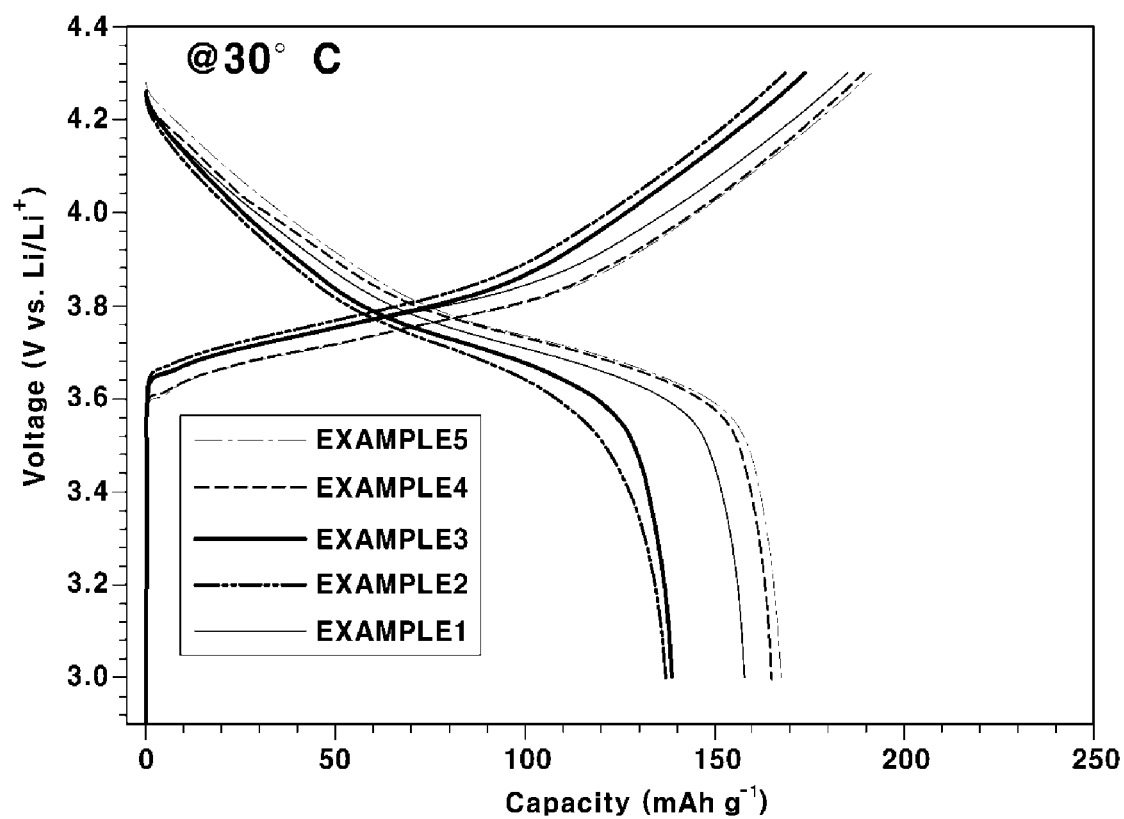
FIG. 3 is a graph showing the evaluation results of charging and discharging of all-solid-state batteries according to Examples 1 to 5.

Experimental Example 2—Evaluation of Performance of All-Solid-State Batteries Depending on Drying Condition of Electrode Slurry Charging and discharging of the all-solid-state batteries according to Examples 1 to 5 were evaluated. The results are shown in FIG. 3. The detailed experimental conditions were the same as in Experimental Example 1.

Referring to the results of Examples 1 to 3, it can be seen that, in the case in which lithium bis(trifluoromethanesulfonyl)imide (LiTFSI) was used as the lithium salt, the electrode was somewhat deteriorated when the electrode slurry was dried at a temperature of about 90° C., whereby the capacities of the batteries were reduced to levels similar to that of the battery according to Comparative Example.

Referring to the results of Examples 4 and 5, on the other hand, it can be seen that, in the case in which lithium bis(pentafluoroethanesulfonyl)imide (LiBETI), which had large-sized negative ions, was used as the lithium salt, the electrode was not deteriorated even when the electrode slurry was dried at a high temperature of about 120° C., and the capacities of the batteries were rather increased.

Figure 4:
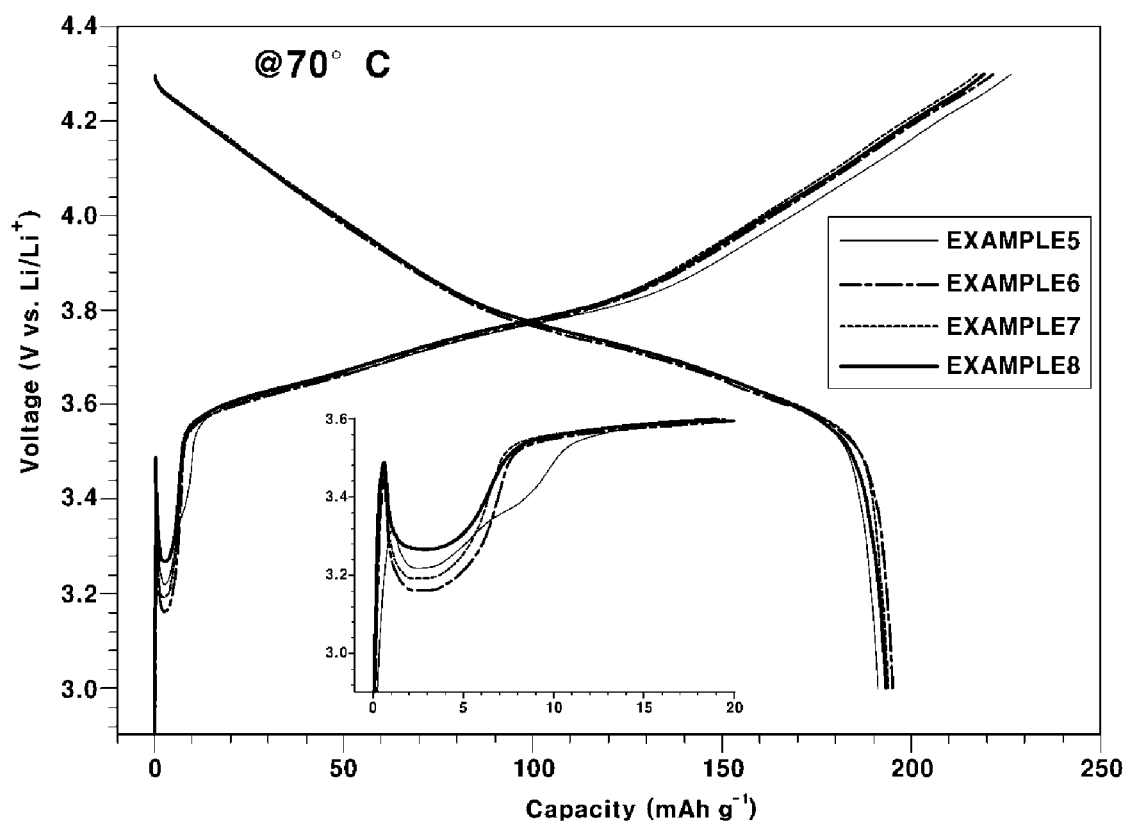
FIG. 4 is a graph showing the evaluation results of charging and discharging of all-solid-state batteries according to Examples 5 to 8.

Experimental Example 3—Evaluation of Performance of All-Solid-State Batteries at High Operating Temperature Charging and discharging of the all-solid-state batteries according to examples 5 to 8 were evaluated. In particular, the all-solid-state batteries were charged and discharged at a high temperature of about 70° C. The results are shown in FIG. 4.

Referring to the result of Example 5, it can be seen that, when the operating temperature of the all-solid-state battery was increased to about 70° C., the behavior of the graph was somewhat fluctuated although there was no great difference.

Referring to the results of Examples 6 to 8, on the other hand, it can be seen that, in the case in which the molar ratio of the lithium salt to the second solvent was increased, in the case in which lithium bis(pentafluoroethanesulfonyl)imide (LiBETI) was used as the lithium salt, and in the case in which a crown-ether-based solvent, which had a high boiling point, was used as the second solvent, the electrode was not deteriorated even when the operating temperature was high, and high capacities of the batteries were maintained.

Figure 5:
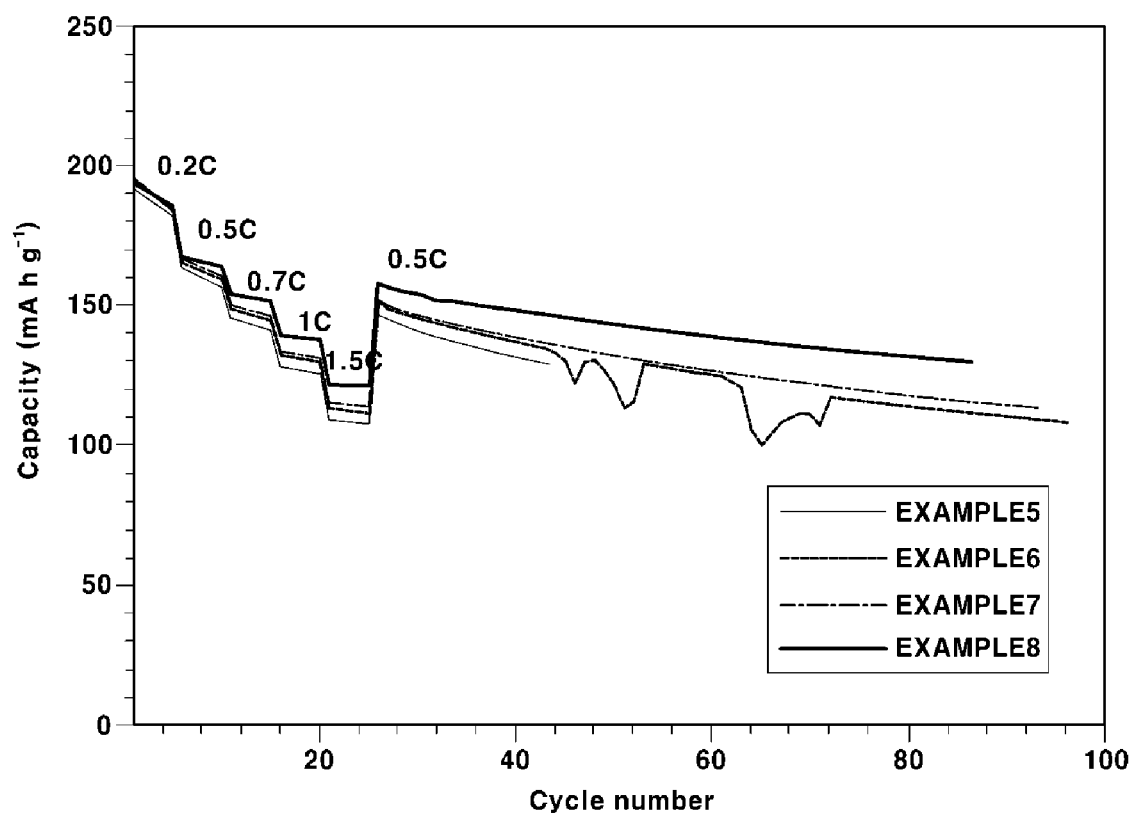
FIG. 5 is a graph showing the evaluation results of charging and discharging cycle performance of all-solid-state batteries according to Examples 5 to 8.

Experimental Example 4—Evaluation of Cycle Performance of All-Solid-State Batteries at High Operating Temperature The cycle performance of the all-solid-state batteries according to Examples 5 to 8 was evaluated. Detailed experimental conditions were as follows. The operating temperature was 70° C., and current densities were 0.52 mA·cm$^{-2}$ (0.2 C), 1.30 mA·cm$^{-2}$ (0.5 C), 1.82 mA·cm$^{-2}$ (0.7 C), 2.60 mA·cm$^{-2}$ (1 C), and 3.9 mA·cm$^{-2}$ (1.5 C). The results are shown in FIG. 5.

Referring to the results of Examples 5 and 6, it can be seen that the behaviors of the graphs were interrupted and fluctuated as the charging and discharging cycles were repeatedly performed. The reason for this seems that the electrodes were somewhat deteriorated as charging and discharging were repeatedly performed at a high operating temperature.

Referring to the results of Examples 7 and 8, on the other hand, it can be seen that, in the case in which the molar ratio of the lithium salt to the second solvent was increased, in the case in which lithium bis(pentafluoroethanesulfonyl)imide (LiBETI) was used as the lithium salt, and in the case in which a crown-ether-based solvent, which had a high boiling point, was used as the second solvent, the electrode was not deteriorated even when the operating temperature was high, and high capacities of the batteries were maintained.

As apparent from the foregoing, according to the present disclosure, an ion-conductive additive, which originates in a binder solution, is uniformly distributed in an electrode, whereby an additional ion transmission path is formed in the electrode. Consequently, it is possible to obtain an all-solid-state battery having a considerably increased charge and discharge capacity and lifespan.

According to the present disclosure, even when an all-solid-state battery is manufactured at a high temperature, an ion-conductive additive is not volatilized. Consequently, it is possible to obtain an all-solid-state battery having considerably increased charge and discharge capacity and lifespan within a short processing time.

According to the present disclosure, even when an all-solid-state battery is used in a high-temperature environment, an ion-conductive additive is not volatilized, and an ion transmission path is formed in an electrode. Consequently, it is possible to obtain an all-solid-state battery having high usability.

The effects of the present disclosure are not limited to those mentioned above. It should be understood that the effects of the present disclosure include all effects that can be inferred from the foregoing description of the present disclosure.

It will be appreciated by those skilled in the art that changes may be made in these aspects without departing from the principles and spirit of the disclosure.

What is claimed is:

1. A method of manufacturing an all-solid-state battery, the method comprising:
    preparing an ion-conductive additive comprising lithium salt and a second solvent;
    mixing a polymer binder, a first solvent, and the ion-conductive additive to manufacture a binder solution;
    mixing the binder solution, an electrode active material, a conductive material, and a solid electrolyte to manufacture an electrode slurry; and
    applying the electrode slurry to a substrate and drying the electrode slurry at a temperature of 60° C. to 120° C. to form an electrode, wherein the first solvent has a dielectric constant (ε) of 1 to 10 and a Gutmann donor number (DN) of 0 to 10, wherein a molar ratio of the lithium salt to the second solvent is 1 to 1.2, wherein the second solvent is selected from a group consisting of triethylene glycol dimethyl ether, 12-Crown-4, 15-Crown-5, 18-Crown-6, or mixtures thereof, and wherein an absolute value (|Δg|) of a difference in dielectric constant between the first solvent and the second solvent ranges from 0 to 5.

2. The method according to claim 1, wherein:

the polymer binder is selected from a group consisting of nitrile-butadiene rubber (NBR), butadiene rubber (BR), polystyrene (PS), styrene butadiene rubber (SBR), polymethyl methacrylate (PMMA), polyethylene oxide (PEO), or mixtures thereof.

3. The method according to claim 1, wherein:

the first solvent is selected from a group consisting of toluene, hexane, dibromomethane, dichloromethane, chloroform, butyl butyrate, hexyl butyrate, or mixtures thereof.

4. The method according to claim 1, wherein:

the lithium salt is selected from a group consisting of lithium hexafluorophosphate ($LiPF_6$), lithium bis(fluorosulfonyl)imide (LiFSI), lithium bis(trifluoromethanesulfonyl)imide (LiTFSI), lithium bis(pentafluoroethanesulfonyl)imide (LiBETI), or mixtures thereof.

* * * * *